Nov. 12, 1929.                E. J. MADDEN                1,735,206
                                 BRAKE
                          Filed Dec. 16, 1925        6 Sheets-Sheet 1

INVENTOR.
Edward J. Madden
BY
Francis D. Hardesty
ATTORNEY.

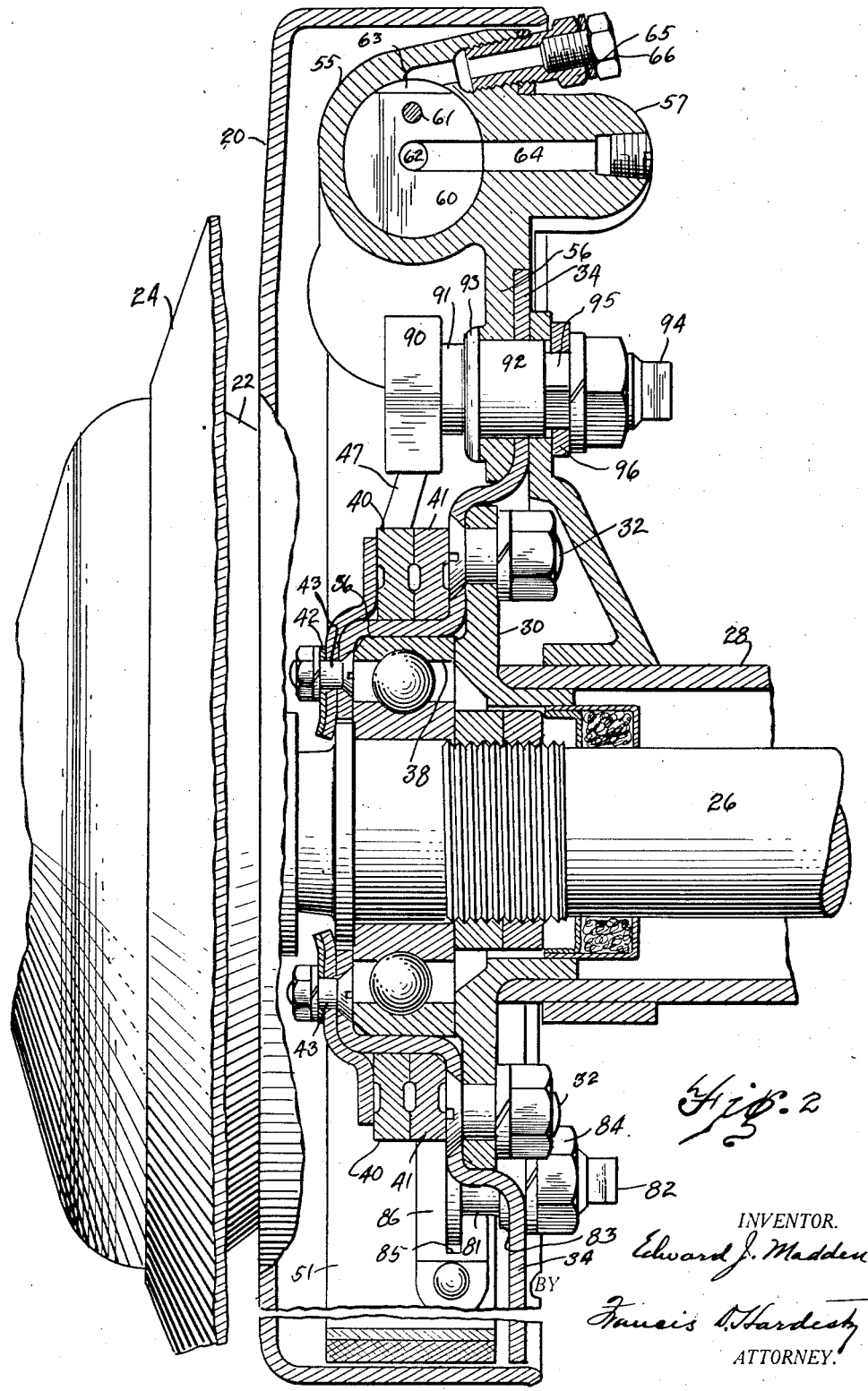

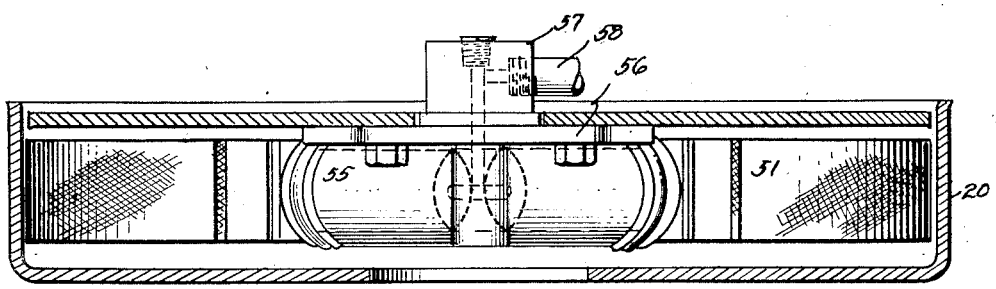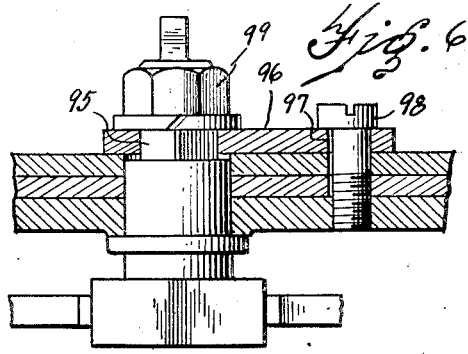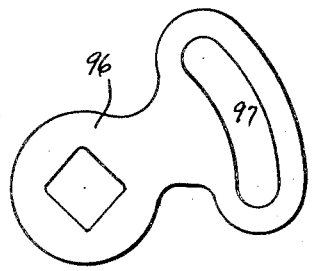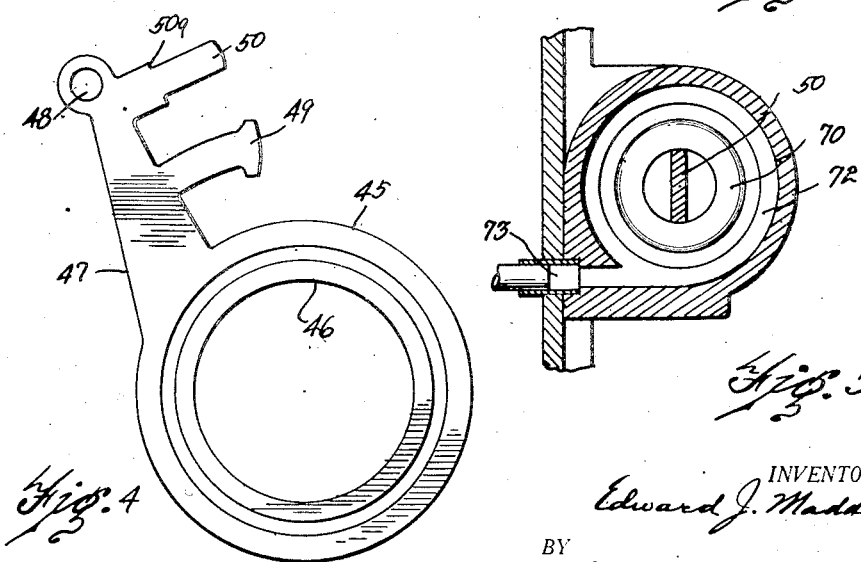

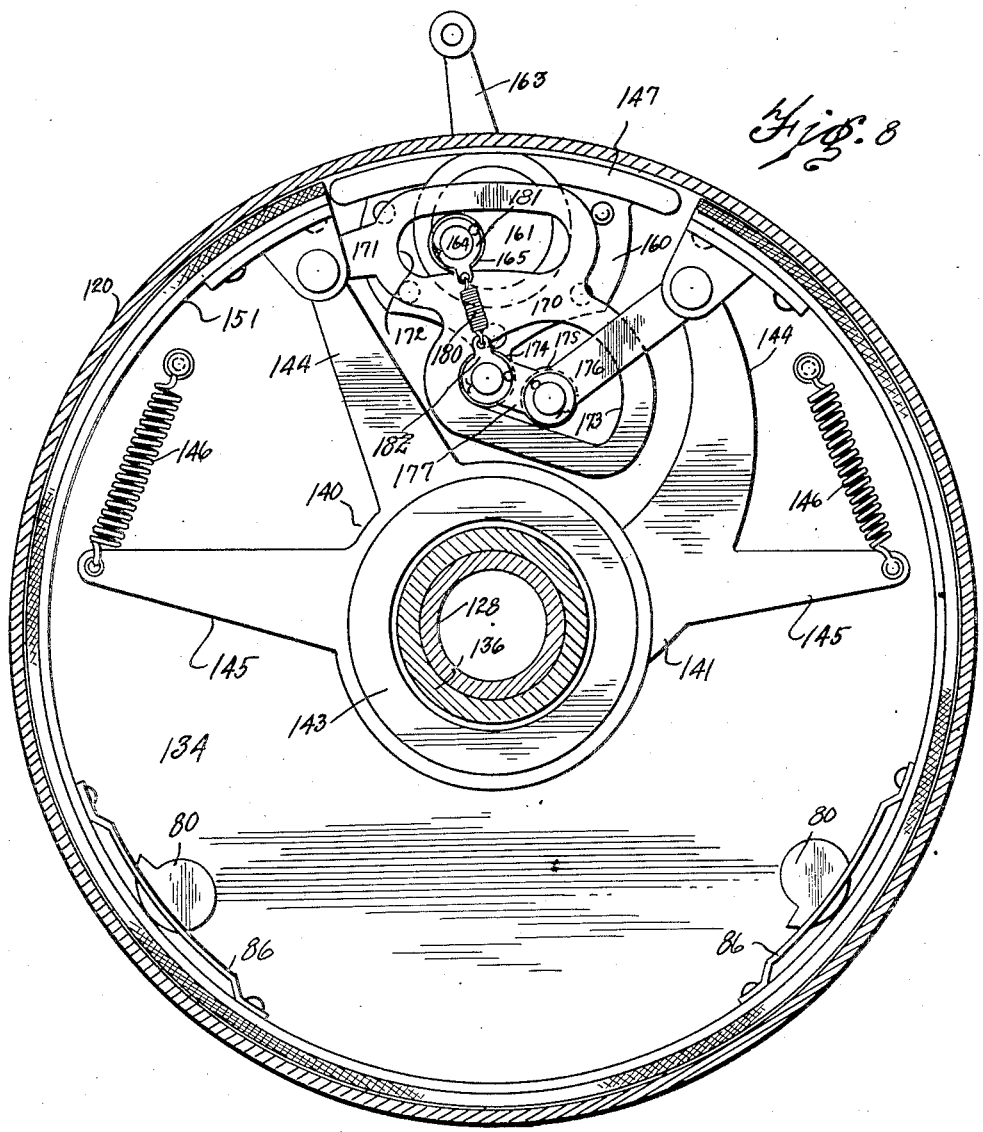

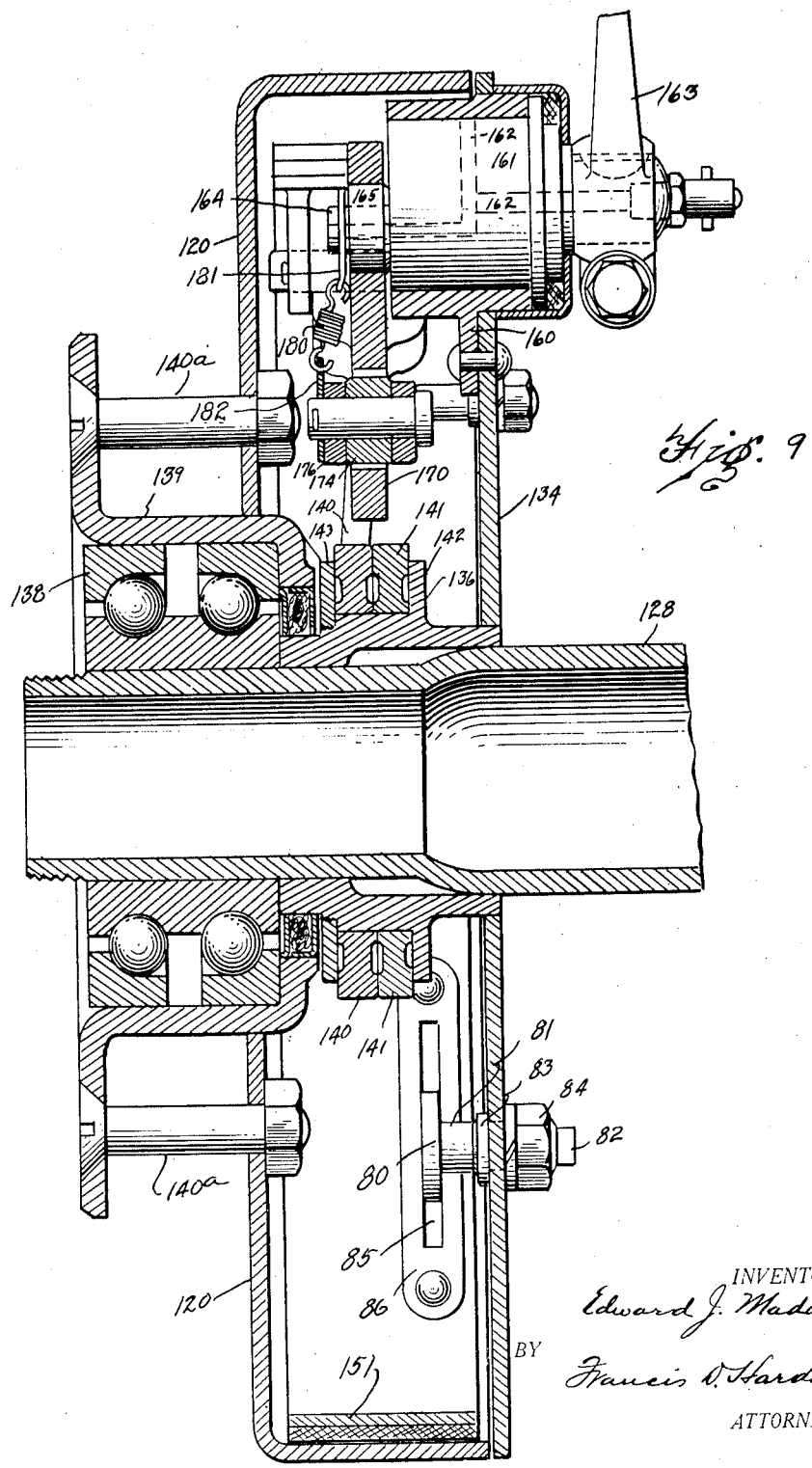

Nov. 12, 1929.  E. J. MADDEN  1,735,206
BRAKE
Filed Dec. 16, 1925   6 Sheets-Sheet 6

INVENTOR.
Edward J. Madden
BY
Francis D. Hardesty
ATTORNEY.

Patented Nov. 12, 1929

1,735,206

UNITED STATES PATENT OFFICE

EDWARD J. MADDEN, OF DETROIT, MICHIGAN

BRAKE

Application filed December 16, 1925. Serial No. 75,695.

The present invention relates to brakes and more particularly to brakes for automotive vehicles.

Among the objects of the invention is a brake in which the braking action is assisted by the movement of the moving brake surface.

Another object is a brake of the type mentioned in which the braking is assisted irrespective of the direction of movement.

Another object is a brake in which the wear will be more uniformly distributed over the braking surface and therefore greatly reduced.

Still other objects include novel means for supporting and adjusting the brake bands whereby the other objects may be accomplished and also novel means for actuating brakes of the type indicated.

With these and other objects in view, as will more clearly hereinafter appear, the invention comprises broadly a brake drum mounted on the moving part and a brake band mounted on the stationary part and in such fashion that its ends may be moved circumferentially a limited distance without radial movement while the rest of the band is free to move radially as well as circumferentially, together with the mounting and actuating means.

Reference should be made to the accompanying drawings, in which:

Fig. 2 is a vertical section therethrough;

Fig. 3 is a top view of the same with parts in section;

Figs. 4, 5, 6 and 7 are views of details thereof;

Fig. 8 is a view similar to Fig. 1 of another form;

Fig. 9 is a vertical section of the latter;

Figure 1:
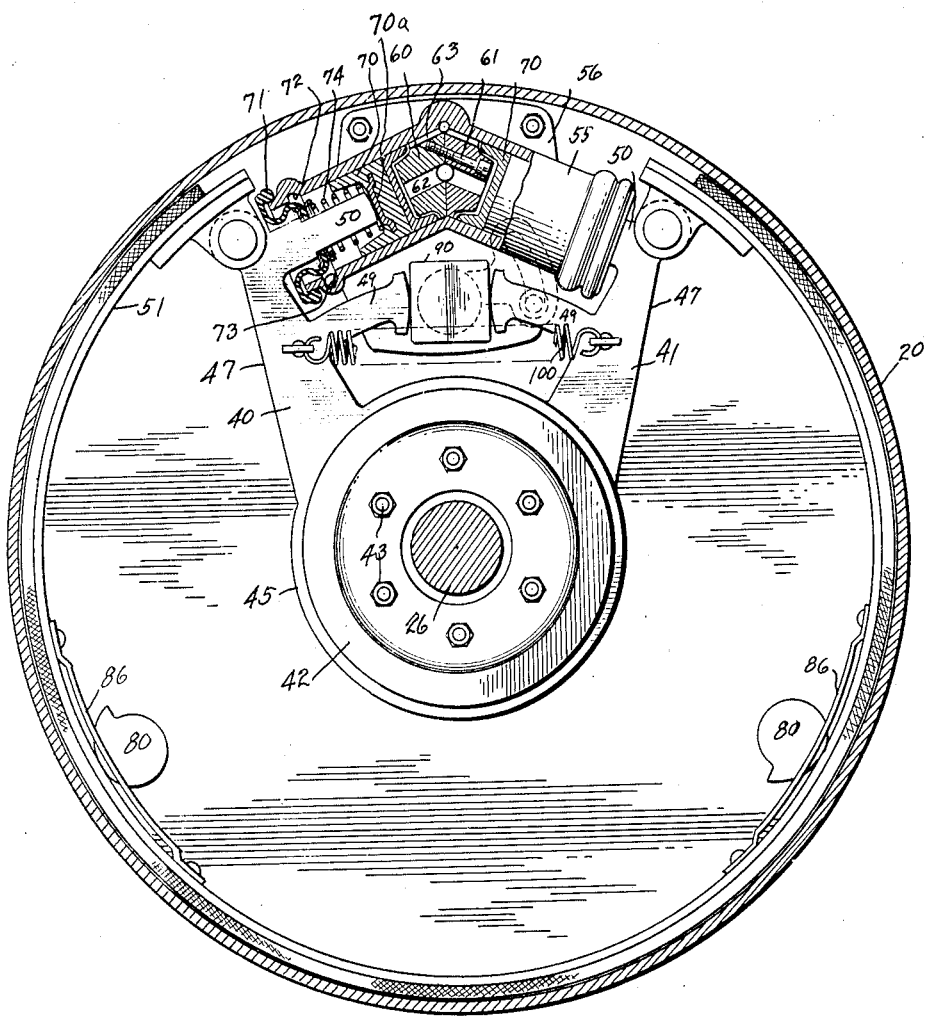
Fig. 1 is a view in elevation of one form of the brake from the wheel side and with the drum in section.

Referring to Figs. 1 to 7, the brake comprises a drum 20 of conventional design secured in the usual manner to a hub 22 of a wheel 24, hub 22 being secured in turn to the axle 26 having a housing 28.

The housing 28 has secured thereto a flange 30 to which, as by bolts 32, is secured the disc 34 carrying the brake actuating mechanism to be described later.

In the form shown in Figs. 1 to 7, the disc 34 is formed at its center to furnish a seat 36 for the ball bearings 38, the latter being held in its seat and against flange 30 by means of the bolts 32. The outside cylindrical portion of seat 36 furnishes a bearing for two brake band supporting members 40 and 41 of the form shown in Fig. 4 and these are held in longitudinal position thereon by means of a plate 42 secured to disc 34 by bolts 43.

As shown in Figs. 1 and 4, members 40 and 41 are substantially identical and consist of the circular body portion 45 having therein a concentric opening 46, the inner surface of which is the bearing surface acting upon the outer surface of seat 36. Integral with or fixed to the portion 45 is an arm 47 provided with an eye 48 at its end, whereby it may be secured to one end of a brake band 51, and two laterally projecting arms 49 and 50.

Carried upon disc 34, as shown best in Figs. 1 and 2, is a double cylinder 55, formed integrally with the plate 56 by means of which it may be bolted or otherwise secured to disc 34, and having a portion 57 projecting through the disc for the attachment of suitable pressure hose indicated at 58. Within cylinder 55 is an angular block 60 formed of two parts secured together by screw 61, and provided with two passages 62 and 63. This block 60 serves as a stop for the pistons at the inner end of their movement and also occupies space that would otherwise have to be filled with the pressure fluid. Passage 62 connects the cylinders proper and is itself connected through a lateral passage 64 to the pressure hose 58, while passage 63 is closed by means of a nipple 65 and plug 66. Passage 63 and its closure permit exit of air when the pressure line is being filled with the liquid pressure medium.

It should be noted that the two parts of cylinder 55 are arranged at an angle to each other and that they approximately lie on chords of a circle concentric with the brake. The position of these cylinders is such that the circumferential movement of arm 50 and the straight movement of the piston produces little or no relative movement with its resulting friction, between the end of arm 50 and that portion of the piston with which it contacts. The substantial alinement of the cylinder with the direction of movement of the rod 50 also reduces to a minimum the friction between the cylinder wall and the piston. It should also be noted that piston 70 is provided at this point with a hardened disc 70$^a$ both to reduce any friction and to prevent penetration of the arm into the metal of the piston as the latter will preferably be die cast of comparatively soft alloy.

Within each end of cylinder 55 is a piston 70 adapted to be actuated by the liquid pressure in the cylinder and in turn to act upon the arm 50 of one of the members 40 and 41, the two pistons of course acting simultaneously. The outer ends of the cylinder are preferably closed by a flexible diaphragm 71, through which the arm 50 extends, and a drain groove 72 having a sloping inner wall with drain passage 73 provided to drain out any liquid passing the pistons 70. The sloping inner wall of this groove permits easy insertion of the soft piston gasket. The diaphragm opening through which passes arm 50 is preferably made tight by a metal washer on each side thereof, which washers are held together and against shoulder 50$^a$ on arm 50 by a light spring 74, whose chief function is, however, to return the piston inwardly.

As mentioned above, the brake band 51 is supported chiefly by the arms 47 of members 40 and 41. It is also supported and maintained in proper relation to the drum 20 by means of two cams 80. These cams are simple spiral cams carried upon short shafts 81 mounted rotatably in disc 34 and having their outer ends squared or flattened as at 82, being also shouldered as at 83 and provided with a locking nut and washer 84 to maintain them in adjusted position. The cams 80 are relatively thin and protrude through slots 85 of plates 86 into contact with brake band 51. Rotation of the cams 80 can therefore be accomplished from the outside and therefore permit the adjustment of the band 51 radially without removing the brake from the drum and the slots 85 will be of such length as to allow a limited circumferential movement of the brake band.

Further, while the operating cylinder and pistons will act as a stop to prevent rotation of the band 51 with the drum 20 under brake operation, a further stop is desirable and at 90 there is shown such a stop which has the additional function of adjusting the brake band. Stop 90 consists of a square cam head carried upon a short shaft 91 and so located as to furnish an abutment for the ends of arms 49 on members 40 and 41. The shaft 91 is provided with a bearing portion 92 passing through disc 34 and plate 56, having a shoulder 93 limiting its outward movement. Its outer end is preferably squared or flattened as at 94 to permit its being turned with a suitable wrench, and is also provided with an intermediate squared portion 95 over which, outside of the disc 34, is placed one end of the indicator plate 96 (shown in plan in Fig. 7), serving as an indicator and keeper for the angular adjustment of the stop. The free end of plate 96 has an arcuate slot 97 through which extends screw 98, limiting the movement of the plate and indicating the position of the head 90. Between the squared portions 94 and 95, the shaft is threaded so as to permit its being locked in adjusted position by the lock nut 99. The brake release spring 100 holds the arms 49 against the stop 90.

When pressure is applied through cylinder 55 and pistons 70 to the arms 40 and 41 in order to apply the brake on drum 20, and the latter is moving in a clockwise direction, the pistons and corresponding ends of the brake band 51 move apart until the band contacts with the drum, whereupon the band is carried around with the latter and arm 40 with its piston pushed back, arm 41 and its piston moving outward a corresponding distance. Further pressure in the cylinder will then move only arm 41. This action is assisted by the friction between the band and drum. When this movement takes place, the arm 40 with its end of the brake band being held, the whole brake band, except the extreme ends, will move radially against the drum.

If the drum is in motion counterclockwise, the action of the pistons and brake band will be reversed. In either case, an action analogous to the so-called "wrapping" action of external brakes is had.

In Figs. 8 and 9, a similar brake with mechanical actuation is shown.

In these figures, the axle housing is shown at 128 carrying near its outer end the inner race of ball bearing 138, upon which is mounted the hub 139 of a wheel. To the latter, as by bolts 140$^a$, is secured the brake drum 120. Also carried by the housing 128 is a disc 134 supporting the brake actuating means and an annular member 136 furnishing a bearing for the brake supporting members 140 and 141, these being held against longitudinal displacement by an integral shoulder 142 and a ring 143.

As in the previously described form, the members 140 and 141 have a circular body portion rotatably carried upon the member 136 and are provided with radially extending arms 144 to which are hinged the ends of the brake band 151. Members 140 and 141 also have radially extending arms 145 to each of which is secured one end of a spring 146, the other end being anchored to disc 134. These springs 146 serve to release the brake and hold the end of the brake band against a stop 147 when the brake is idle.

Secured to disc 134 is a plate 160, having at its upper edge the stop 147 against which the ends of the brake band 151 abut when the brake is idle, and having mounted therein a short shaft 161 provided with passages 162 for lubricant. Shaft 161 is also provided with means at its outer end for attachment of the operating lever 163 and at its inner end with an eccentrically located pin 164 carrying a roller 165.

Lever 163, through the shaft 161 and pin 164, is adapted to actuate a toggle joint shown best in Fig. 8 whereby the ends of the brake band may be pushed apart in the same manner as by the hydraulic cylinder and pistons shown in the previous figures.

This toggle joint consists of a plate 170 connected to brake band 151 and arm 144 of member 140 by means of a short lateral arm 171. Plate 170 is somewhat like the figure "8" having as its upper opening an elongated slot 172 in the form of an arc having its center at the center of the hub when the brake is at rest and with its width approximately the diameter of the roller 165. This opening is of such shape that the band 151 may be adjusted to take up for wear without changing the position of the foot pedal. The lower opening 173 is roughly D-shaped with the straight side approximately horizontal. As indicated, slot 172 coacts with roller 165 on pin 164. Co-acting with the opening 173 is a pair of rollers 174 and 175 carried on a link 176 having an angular extension 177 and hinged at its other end to the other end of brake band 151 and to arm 144 of member 141. Roller 175 is carried on link 176 at the angle therein and roller 174 at the end of the link extension 177. When the lever 163 is moved to the right (Fig. 8) and as a result the link 170 is lifted, roller 174 takes the thrust of link 176 and rolls along the upper left side of opening 173.

The spring 180 connecting the washers 181 and 182 serving to retain rollers 165 and 174 on their respective pins, prevents rattling of these parts and maintains them in contact with the co-acting surfaces of the openings 172 and 173.

The operation of this form of brake produces the same uniform braking action as that produced by the form shown in Figs. 1 to 7. The so-called "wrapping" action is produced in the same manner and the wear is uniformly distributed over the entire brake band except for the extreme ends.

Figure 10:
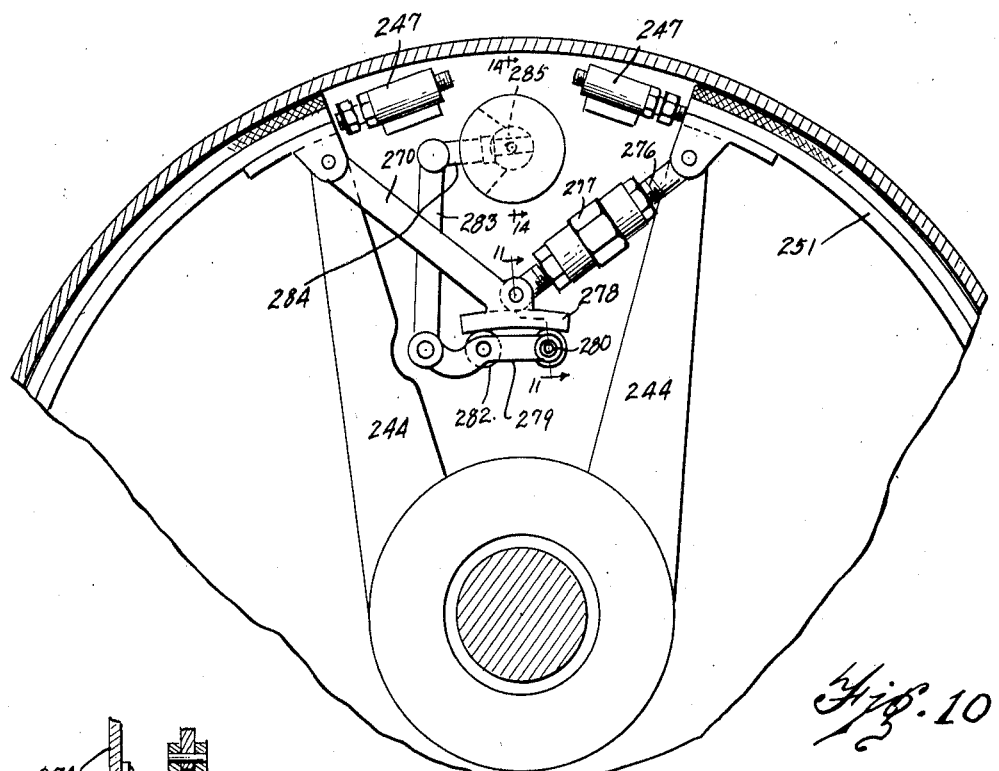
Fig. 10 is a more or less diagrammatic view of still another form of brake involving the invention.

In Fig. 10 there is shown another form of toggle actuated brake having the radial arms 244 connected to the brake band 251 and the adjustable stops 247 for the ends thereof.

Figure 11:
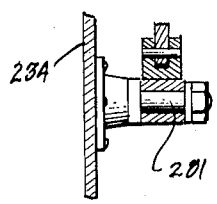
Fig. 11 is a section on the line 11—11 of Fig. 10.

The actuating mechanism in this form consists of the toggle links 270 and 276 of which link 276 is adjustable in length by means of turnbuckle 277. Link 270 is provided at its lower end with an actuating shoe 278 integral therewith and having an arcuate under surface concentric, when idle, with the brake band. The toggle is actuated by a lever 279 fulcrumed at 280 on the pin 281 fixed to the brake supporting disc 234 (see Fig. 11). This lever 279 carries a roller 282 a short distance from the fulcrum to coact with shoe 278 and its free end is connected through link 283 to a crank arm 284 fixed to shaft 285 rotatable by the brake lever (not shown). The function of the arcuate shoe 278 is the same as that of the arc shaped slot 172 in Fig. 8.

Figure 14:
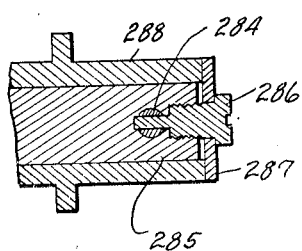
Fig. 14 is a section on line 14—14 of Fig. 10.

Fig. 14 shows the preferred means of securing arm 284 to shaft 285. In this figure, the arm 284 is indicated as passing transversely through shaft 285 and as having a small transverse bore. Shaft 285 is drilled longitudinally for a short distance to receive a screw 286 having a reduced end adapted to pass into the transverse bore in arm 284. Screw 286 is also used to secure the washer 287 over the end of sleeve 288 serving as a bearing for shaft 285 and thereby preventing longitudinal movement of the shaft.

Figure 12:
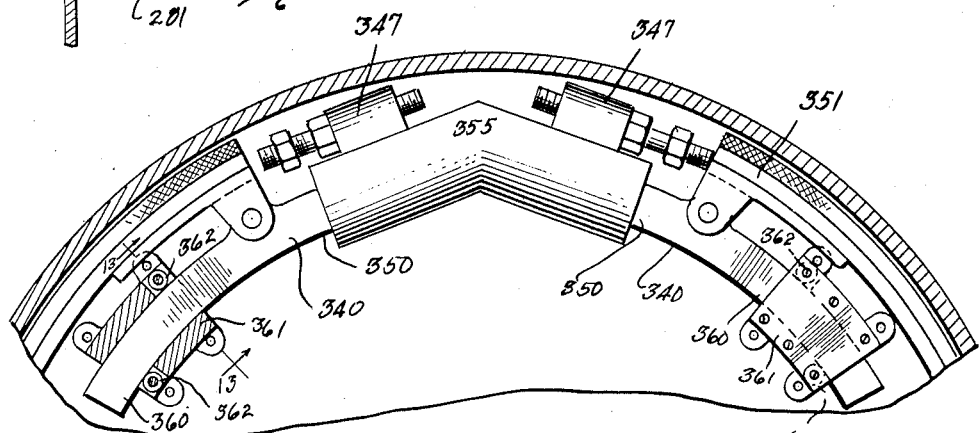
Fig. 12 is a view of another form of hydraulic brake.
Figure 13:
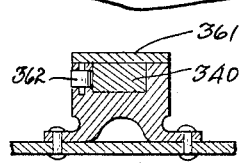
Fig. 13 is a section on line 13—13 of Fig. 12.

Fig. 12 shows another form of hydraulic brake and a somewhat different means for performing the function of the arms 40 and 41 (of Fig. 1). In this figure the brake band is shown at 351 with end stops 347 such as those shown in Fig. 10 and a double angular pressure cylinder 355 such as cylinder 55 of Fig. 1.

However, instead of radial arms to fix the distance from the center to the ends of the brake band, the latter are hingedly secured to the intermediate portions of two arcuate bars 340 of which one end of each 350 coacts with a piston in cylinder 355 as a piston rod and the other end 360 passes through an arcuate guide 361, provided with rollers 362. As the bars 340 are arcuate and arranged concentric with the brake drum and guided in the arcuate guides 361, they serve to maintain the ends of the brake band at a fixed radial distance from the center of the assembly. Further, as these bars 340 slide freely in the guides 361, the entire brake band is permitted to move circumferentially, the movement, of course, being limited by the stops 347.

Having now described the invention and the preferred forms of embodiment thereof, it is to be understood that the invention is not to be limited to the precise details herein described and shown but only by the scope of the claims which follow.

I claim:

1. In an internal expanding brake for a rotatable drum, a brake band adapted to be expanded against said drum by separating the ends thereof, supporting means for said band adapted to permit said separation while preventing radial movement of the said ends, actuating means for said brake band adapted to move said ends relatively and in a circumferential direction, said actuating means adapted to permit circumferential movement of the entire brake band, and a stop for limiting said movement.

2. In an internal expanding brake for a rotatable drum, a brake band adapted to be expanded against said drum by separating the ends thereof, supporting means for said band adapted to permit said separation while preventing radial movement of said ends, actuating means for said brake band adapted to move said ends relatively and in a circumferential direction, said actuating means adapted to permit circumferential movement of the entire brake band in either direction, and a stop for limiting said movement.

3. In a brake consisting of a drum and an internal expanding brake band having means to fix the radial position of the ends of said band, a toggle joint for expanding said band constructed and arranged to move the ends of said band relatively while permitting circumferential movement of the entire band, and a stop for limiting said circumferential movement.

4. In a brake consisting of a drum and an internal expanding brake band having means to fix the radial position of the ends of said band, a toggle joint for expanding said band constructed and arranged to move the ends of said band relatively while permitting circumferential movement of the entire band, means whereby the ends of said band may be adjusted to compensate for wear without changing the position of the operating lever, and a stop for limiting the said circumferential movement.

5. In a brake comprising a drum and an internal expanding brake band, a toggle joint for expanding said band, and means to actuate said joint, said toggle including an arcuate surface with which said means coacts, said arcuate surface being concentric with said drum when said brake is idle.

6. In a brake comprising a drum and an internal expanding brake band, a toggle joint for expanding said band, and means to actuate said joint, said toggle including on one of its arms and integral therewith an arcuate surface with which said means coacts, said arcuate surface being concentric with said drum when said brake is idle.

EDWARD J. MADDEN.